Feb. 17, 1959 R. P. BURR ET AL 2,874,211

COLOR-IMAGE-REPRODUCING APPARATUS

Filed Aug. 16, 1954

United States Patent Office 2,874,211

Patented Feb. 17, 1959

2,874,211

COLOR-IMAGE-REPRODUCING APPARATUS

Robert P. Burr, Huntington, and Raymond J. Keogh, Forest Hills, N. Y., assignors to Hazeltine Research, Inc., Chicago, Ill., a corporation of Illinois Application April 16, 1954, Serial No. 423,746

2 Claims. (Cl. 178—5.4)

*General*

Figure 1:
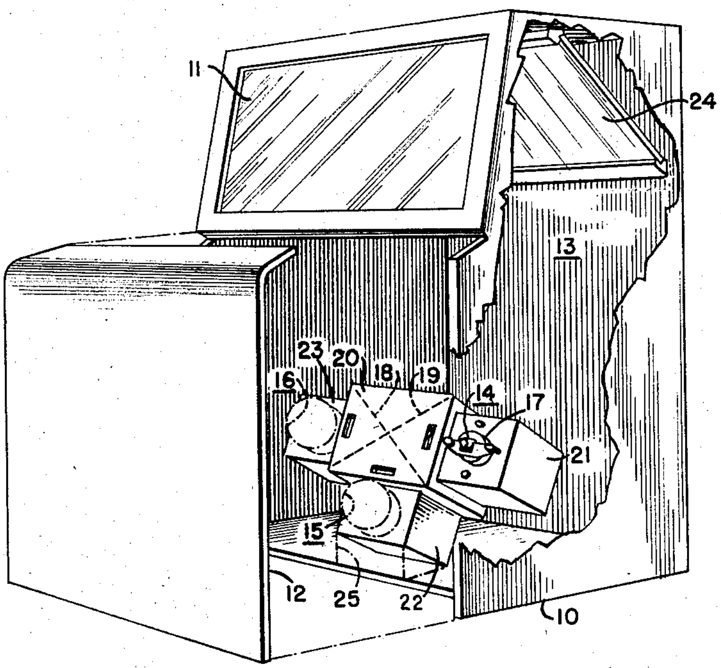

This invention relates to color-image-reproducing apparatus for color-television receivers of the projection type. In apparatus of such type utilizing a plurality of cathode-ray devices which project component color images to a display screen to develop a composite image thereon, it is necessary that the cathode-ray devices and any adjustable elements associated therewith be precisely positioned and adjusted to develop a composite color image having components in register and in focus. In color-image-reproducing apparatus heretofore proposed, the necessary adjustable elements have not been readily accessible to a viewer of the display screen, thus rendering it difficult to adjust the register and focus of the image components on the display screen while observing the screen.

It is an object of the present invention to provide a new and improved color-image-reproducing apparatus for a color-television receiver of the projection type which avoids one or more of the above-mentioned disadvantages of such apparatus heretofore proposed.

It is another object of the present invention to provide a new and improved color-image-reproducing apparatus of the type described having elements controlling the focus and register of the image components developed on the display screen thereof which are readily accessible to an observer of the display screen.

It is an additional object of the present invention to provide a new and improved color-image-reproducing apparatus of the type described including beam-control elements and elements for positioning the cathode-ray tubes thereof for controlling the focus and register of the image components developed on the display screen which are readily accessible to an observer of the display screen.

In accordance with a particular form of the invention, in a color-television receiver of the projection type, color-image-reproducing apparatus comprises a cabinet for housing the apparatus including at one face thereof a display screen and a displaceable cover enclosing a chamber and electro-optical means attached to the cabinet within the chamber for projecting component color images to the display screen to develop a composite image thereon and including elements accessible from the cabinet face by displacement of the cover for adjusting the image register.

For a better understanding of the present invention, together with other and further objects thereof, reference is had to the following description taken in connection with the accompanying drawing, and its scope will be pointed out in the appended claims.

Figure 2:
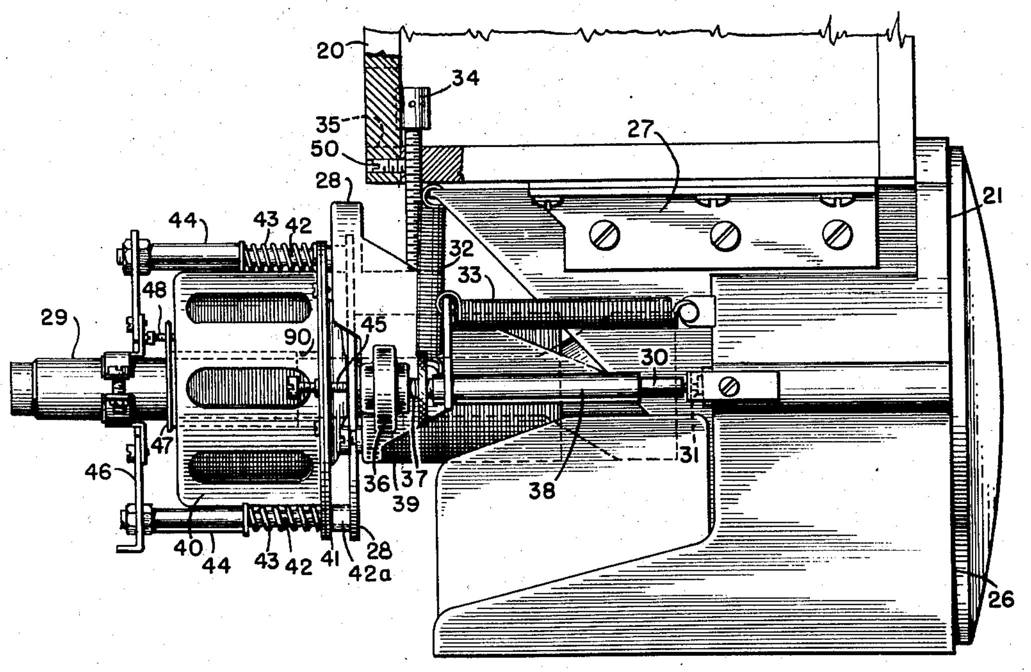

Referring to the drawing:

Fig. 1 is a perspective view, partially fragmentary, of a color-image-reproducing apparatus constructed in accordance with the invention, and Fig. 2 is a top view of an optical support unit of the Fig. 1 apparatus representing in detail the adjustable elements utilized to control the image focus and register on the display screen.

*Description of Fig. 1 apparatus*

Referring now more particularly to Fig. 1 of the drawing, there is represented a color-image-reproducing apparatus constructed in accordance with the invention and suitable for use in a color-television receiver of the projection type. The apparatus comprises a cabinet 10, shown in fragmentary view, for housing the apparatus including at one face thereof a display screen 11, for example, a translucent sheet of diffusing material and a displaceable front cover 12 enclosing a chamber 13. The cabinet 10 preferably is disposed in an upright position while the displaceable cover 12 preferably is removably disposed beneath the display screen and may be removably attached thereto by any suitable means (not shown) such as clips, clasps, etc.

The apparatus also includes electro-optical means attached to the cabinet within the chamber for projecting component color images to the display screen to develop a composite image thereon and including elements accessible from the aforesaid cabinet face by displacement of the cover for adjusting the image register. More particularly, the electro-optical means preferably includes a plurality of cathode-ray tubes 14, 15, and 16 adjustably mounted on three optical support units 21, 22, 23, respectively, attached to a box 20 in the form of a hollow, right parallelepiped and more fully described subsequently. The support unit 22 may be attached to the cabinet 10 by suitable means 25, represented schematically in broken-line construction. The tubes 15 and 16 preferably are of similar construction to the device 14 and are represented schematically in broken-line construction. The cathode-ray tubes preferably have electromagnetic focus windings, for example, winding 17 of the tube 14, adjustably disposed with respect thereto.

The electro-optical means preferably also includes optical dichroic means comprising, for example, a pair of crossed dichroic mirrors 18 and 19 represented by broken lines and disposed within the box 20. The box 20, the dichroic mirrors 18, 19 disposed therein, and the three support units 21, 22, and 23 for the cathode-ray tubes 14, 15, and 16, respectively, preferably comprise a rigid unitary structure of the type described and claimed in the copending application of William F. Bailey and Robert P. Burr, Serial No. 423,745, filed concurrently herewith, and entitled "Optical Structure for Color-Image-Reproducing Apparatus of the Projection Type."

The adjusting elements of the electro-optical means preferably comprise elements for adjusting the relative positions of the cathode-ray tubes 14, 15, and 16 with respect to each other and the positions of the focus windings with respect thereto for controlling the image register, as will be more fully described hereinafter.

The electro-optical means preferably also includes a plane mirror 24 obliquely disposed within the chamber 13 with respect to the direction of projection of light images from the optical structure for directing such images to the display screen. The cabinet 10 preferably also houses suitable receiver apparatus (not shown) which may, for example, be attached to the side walls thereof for supplying to the image-reproducing apparatus signals representing a composite color image to be reproduced.

Referring now more particularly to Fig. 2, the optical support unit 21 is attached to the support box 20, shown in fragmentary view. The unit 21 may, for example, be similar to a conventional type of projection optical unit, such as that manufactured and sold by the North American Philips Co. under the name "Protelgram System." A system of the "Protelgram" type is described in an article entitled "Home Projection Television, Part I, Cathode-Ray Tube and Optical System," by Rinia, De Gier, and Van Alphen, Proceedings of the I. R. E., March 1948. The unit 21 of Fig. 2 comprises, for example, a suitable metal frame or housing 26 attached to the box 20 by a bracket 27. There is adjustably mounted on the housing 26 a support 28 for a cathode-ray tube 29. A control knob 36 is provided for adjusting the position of support 28 by adjustment of a threaded screw 37 extending through a sleeve 38 of the support 28 and having a tip 30 disposed in a socket 31 on the housing 26. Thus, the support 28 is pivotally mounted on the frame 26 by the tip 30 of the screw 37 disposed in socket 31 and is maintained in position by springs 32 and 33 and adjustable cap screw 34 mounted in the box 20 and accessible through an aperture 35 therein. A suitable lock screw 50 for the bolt 34 is threaded in a bore in the box 20. Similar springs and adjustable elements on the other side of the unit 21 (not shown) are also provided for universally positioning the support 28.

There is also provided the usual electromagnetic deflection winding structure or yoke 39 attached to the support 28 and a focus winding structure 40 which is adjustably mounted on the support 28. More particularly, the focus winding structure 40 includes a base plate 41 slidably mounted on a pair of studs 42, 42 and maintained in position by coil springs 43, 43 disposed about the studs between stepped portions 44, 44 thereof and the base plate 41. A suitable spacer 42*a* is disposed between the base plate 41 and the support 28 to fixedly position the focus winding structure 40 at one point. The focus winding structure 40 is also maintained in position by an adjustable cap screw 45 for adjusting the position of the focus winding structure 40 relative to the cathode-ray tube 29. The focus winding structure 40 and associated mounting elements are represented in the drawing in a position rotated approximately 45° clockwise from a preferred position thereof for clarity of description.

A suitable clamping structure 46 supports the neck of the tube 29 while a magnetic shunt 47 comprising, for example, a suitable flanged steel cylinder preferably is slidably disposed about the neck of the device 29 and is adjustably positioned relative to the focus winding structure 40 by means of an adjustable cap screw 48 threaded in the flange of the shunt. The magnetic shunt 47 preferably fits tightly within an axial aperture 90 of the focus winding structure 40 and may be gradually disengaged from the structure 40 by adjustment of the screw 48.

*Operation and adjustment of Fig. 1 apparatus*

During the operation of the Fig 1. apparatus, component color images developed by the cathode-ray devices 14, 15, 16 are projected through the optical support units 21, 22, 23 to the dichroic mirrors 18, 19 for translation and reflection through an aperture (not shown) in the box 20 to the mirror 24 and then to the display screen 11 to provide a composite color image thereon when the apparatus is properly adjusted.

To adjust the optical support units of the Fig. 1 apparatus to provide a composite color image on the display screen having color-image components in focus and in register, the cover 12 of the cabinet may be removed, providing ready access to the previously described adjustable elements. Referring now to Fig. 2, to provide a component image on the display screen of the apparatus which is approximately in register with the other component images developed by the other cathode-ray tubes, the cap screw 34 in the box 20 may be adjusted to position the support 28, the cathode-ray tube 29, the focus winding structure 40, and deflection winding structure 39 as a unit with respect to the box 20 in a given plane. The control knob 36 and corresponding knob on the other side of the unit 21 (not shown) may also be adjusted to position the support 28 and associated components relative to the box 20 in a plane normal to the given plane by adjusting the screw 37 in the sleeve 38. The lock screw 50 may then be tightened against the screw 34 to lock the same in position.

During these adjustments, the clamp 46 may be loosened and the cathode-ray tube 29 moved slightly within the focus winding structure 40 while the focus winding structure 40 may be adjusted with respect to support 28 by adjusting screw 45 to provide a component image on the display screen which is in focus and in register with the image components developed by the other cathode-ray tubes. The magnetic shunt 47 may also be positioned relative to the focus winding structure 40 by means of adjustable screw 48 for imparting a desired beam-control characteristic to the focus winding substantially identical to the beam-control characteristics of the focus windings of the other cathode-ray tubes. The adjustments are interrelated to some degree and it may, therefore, be necessary to repeat one or more steps until the desired image focus or register is obtained.

From the foregoing description it will be apparent that color-image-reproducing apparatus constructed in accordance with the present invention has the important advantage that adjustable elements necessary to provide image register and focus of the cathode-ray devices of the apparatus are readily accessible to one observing the display screen. Thus, the effect of the necessary adjustments can be readily observed and the adjustments may be precisely made thus simplifying the adjustment operation and providing a desirable composite image.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a color-television receiver of the projection type, color-image-reproducing apparatus comprising: an upright cabinet for housing the apparatus including at one face thereof a translucent display screen and a displaceable cover beneath the display screen enclosing a chamber; electro-optical means including a plurality of cathode-ray tubes having electro-magnetic focus windings, lens means, optical dichroic means, and a common support therefor attached to said cabinet within said chamber for projecting component color images and including a plane mirror obliquely disposed within said chamber with respect to the direction of projection of said component color images for directing the same to said display screen to develop a composite image thereon and including elements accessible from said cabinet face by displacement of said cover for adjusting the relative positions of said cathode-ray tubes with respect to each other and the positions of said focus windings with respect to said cathode-ray tubes for controlling the image register.

2. In a color-television receiver of the projection type, color-image-reproducing apparatus comprising: a cabinet for housing the apparatus including at one face thereof a display screen and a displaceable cover enclosing a chamber; and electro-optical means including a plurality of cathode-ray tubes, lens means, and optical dichroic means attached to said cabinet within said chamber for projecting component color images from said cathode-ray tubes and including a plane mirror obliquely disposed within said chamber with respect to the direction of projection of said component color images for directing the same to said display screen to develop a composite image thereon and including elements accessible from said cabinet face by displacement of said cover for adjusting the image register.

References Cited in the file of this patent

UNITED STATES PATENTS

| | | |
|---|---|---|
| 2,273,801 | Landis | Feb. 17, 1942 |
| 2,287,307 | Herbst | June 23, 1942 |
| 2,476,494 | Jones | July 19, 1949 |
| 2,568,543 | Goldsmith | Sept. 18, 1951 |
| 2,672,502 | Albright | Mar. 16, 1954 |